(12) United States Patent
Kraudy

(10) Patent No.: US 6,983,834 B1
(45) Date of Patent: Jan. 10, 2006

(54) CONDUCTOR RAIL

(75) Inventor: Kyle D. Kraudy, Omaha, NE (US)

(73) Assignee: Insul-8 Corporation, Omaha, NE (US)

( * ) Notice: Subject to any disclaimer, the term of this patent is extended or adjusted under 35 U.S.C. 154(b) by 0 days.

(21) Appl. No.: 11/038,339

(22) Filed: Jan. 19, 2005

(51) Int. Cl.
*B60M 1/00* (2006.01)

(52) U.S. Cl. ............................ 191/22 DM; 191/29 DM

(58) Field of Classification Search .......... 191/29 DM, 191/22 DM, 22 R, 29 R, 30
See application file for complete search history.

(56) References Cited

U.S. PATENT DOCUMENTS 3,917,039 A * 11/1975 Maitland ............... 191/29 DM
5,047,595 A    9/1991 Hartland ............... 191/22 DM
5,061,829 A * 10/1991 Mier ..................... 191/22 DM
5,279,397 A    1/1994 Hartland ............... 191/22 DM \* cited by examiner

*Primary Examiner*—Mark T. Le
(74) *Attorney, Agent, or Firm*—Thomte, Mazour & Niebergall; Dennis L. Thomte

(57) ABSTRACT

A conductor rail comprising a main body having a facing cap mounted thereon. The main body is comprised of aluminum while the facing cap is comprised of a stainless steel material. The main body of the conductor rail has a head portion which has channels extending into the opposite sides thereof. The facing cap comprises a top portion which is positioned upon the upper part of the head portion and which has side portions welded to plate members positioned in the channels.

8 Claims, 2 Drawing Sheets

CONDUCTOR RAIL

BACKGROUND OF THE INVENTION

1. Field of the Invention

This invention relates to a conductor rail, such as is used in electric railway systems, overhead conveyors, etc., and which has a main body of aluminum and a stainless steel facing cap.

2. Description of the Related Art

Many types of conductor rails have been previously provided which are used in electric railway systems and which are also used on overhead conveyors, etc. The conductor rails of the prior art include a main body of aluminum and a facing layer or facing cap comprised of a stainless steel material to provide a wear-resisting engagement surface for a contact shoe which slides against the top surface of the facing layer or cap rather than the top surface of the main body.

The prior art facing layers or caps include many different designs and many different methods of attaching the facing layers or caps to the main body. In some cases, the facing layers or caps are snapped into place on the head portion of the main body such as disclosed in U.S. Pat. No. 5,279,397 to Hartland. Another type of means of attaching the facing layer to the head portion of the main body is disclosed in U.S. Pat. No. 5,047,597 wherein two J-shaped members are welded together at the top of the main body.

It is believed that the prior art facing layers such as described in U.S. Pat. No. 5,279,397 may be difficult to assemble. It is also believed that the requirement of the weldment which attaches the two J-shaped members to the head portion of the main body in U.S. Pat. No. 5,047,597 shortens the life of the contact shoe which will slide upon the weldment even though the weldment has been ground or smoothed.

SUMMARY OF THE INVENTION

A unique conductor rail is disclosed wherein a three-piece facing cap is welded onto the main body of the conductor rail. The main body of the conductor rail includes a base portion, a vertical stem portion, and a head portion. The head portion has a top surface and opposite side surfaces with each of the opposite side surfaces thereof having a channel formed therein. A generally C-shaped facing cap is secured to the head portion and includes a top portion having opposite side portions which extend downwardly therefrom, the lower ends thereof terminating adjacent the outer ends of the channels. The facing cap also includes plate members which are welded to the lower ends of the side portions and which extend into the channels to secure the facing cap to the main body of the conductor rail. The main body is comprised of an aluminum alloy material such as 6101 or 6063 while the facing cap is comprised of a 300 series stainless steel material having a 2B finish. The stainless steel material contains approximately 18% chromium.

The top portion of the facing cap is smooth and hard to extend the life of the conductor rail and the contact shoe which is in engagement therewith.

It is therefore a principal object of the invention to provide a conductor rail which is easily assembled.

A further object of the invention is to provide a method of securely attaching a facing cap to the main body of the conductor rail.

Still another object of the invention is to provide a facing cap for a conductor rail wherein the top surface thereof is smooth and hard and does not include a weldment thereon.

Still another object of the invention is to provide a conductor rail which will perform satisfactorily for a long period of time.

Yet another object of the invention is to provide a conductor rail which is economical of manufacture, durable in use and refined in appearance.

These and other objects will be apparent to those skilled in the art.

DETAILED DESCRIPTION OF THE INVENTION

Figure 1:
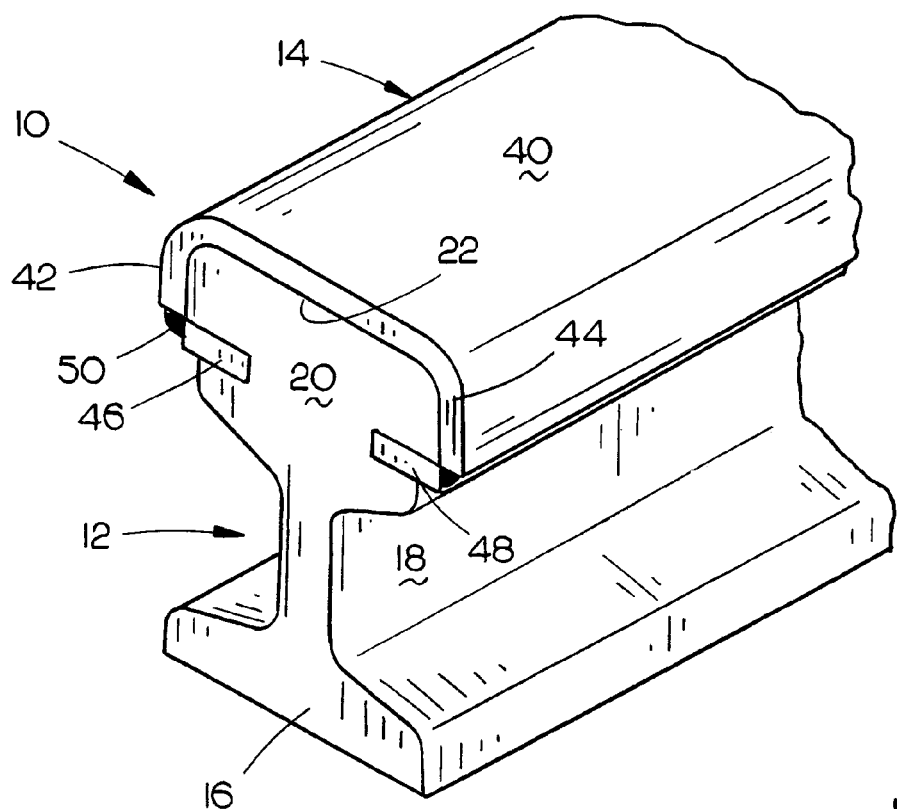
FIG. 1 is a partial perspective view of the conductor rail of this invention.
Figure 2:
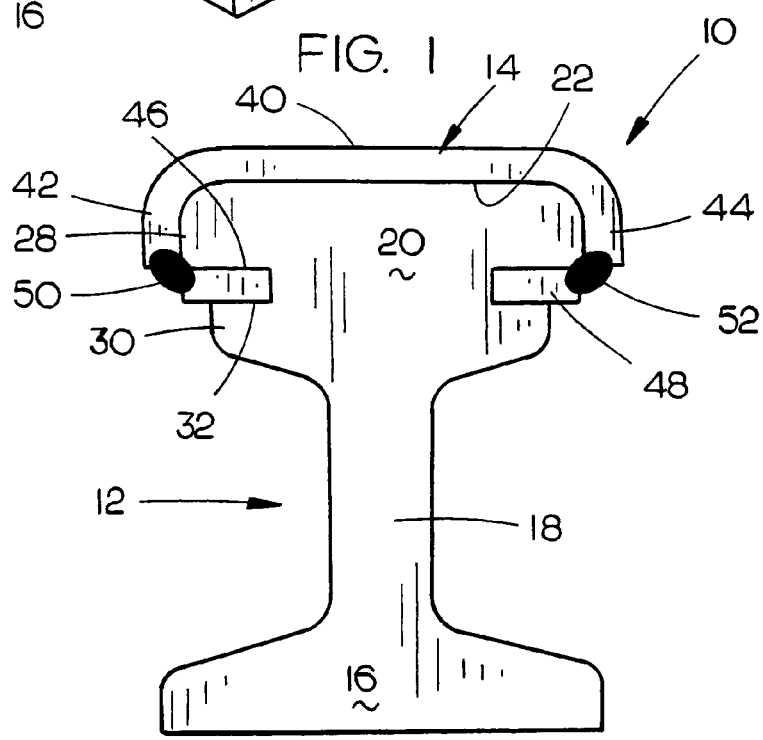
FIG. 2 is an end view of the conductor rail of this invention.

The conductor rail of this invention is referred to generally by the reference numeral 10 which includes a main body 12 and a facing cap 14 attached thereto. Main body 12 is preferably comprised of an aluminum alloy material such as 6101 or 6063 while cap 14 is preferably comprised of a 300 series stainless steel such as 301 with a 2B finish. Both the 6101 and 6063 alloy aluminum materials are relatively low in electrical resistance.

Figure 3:
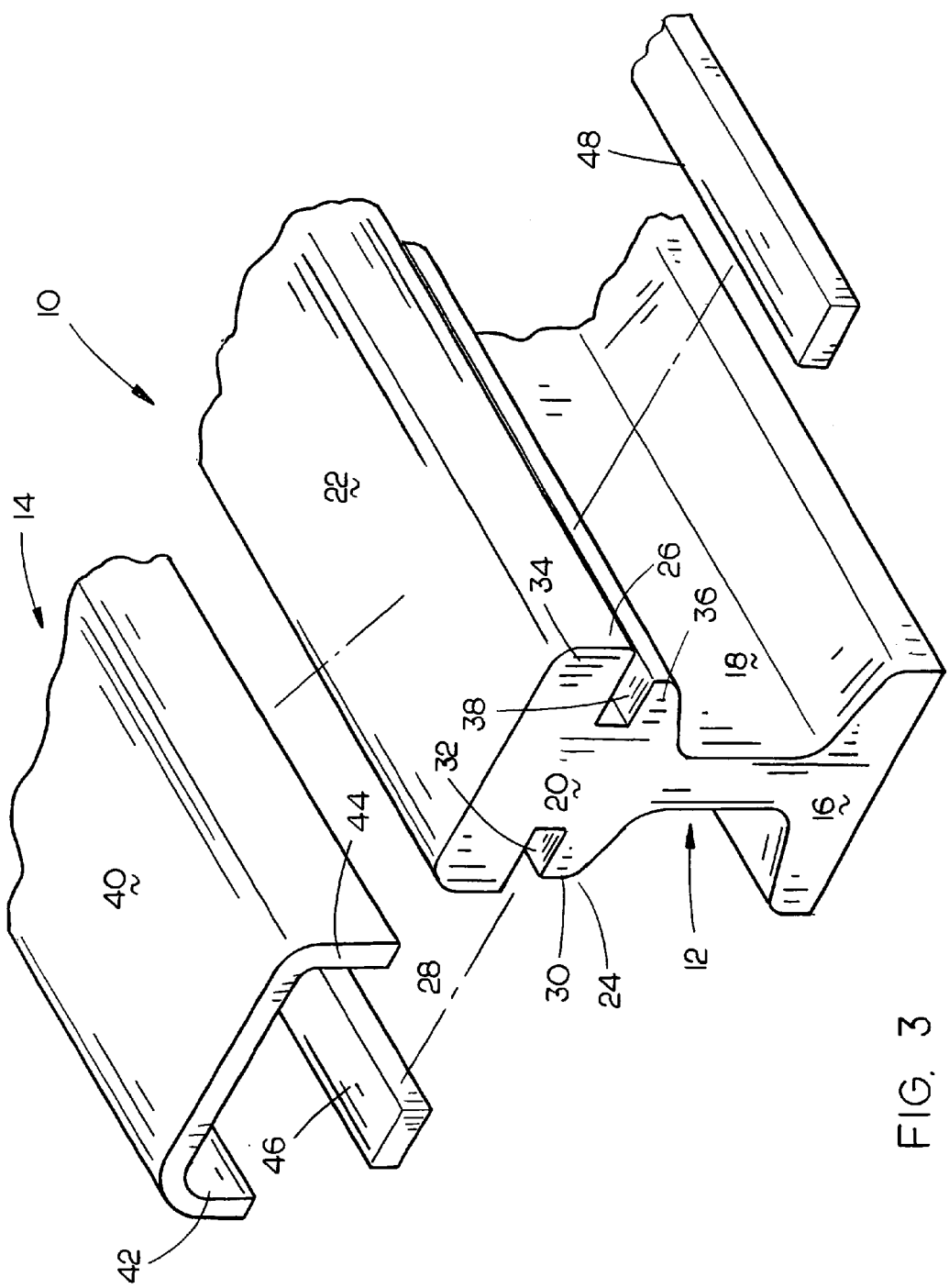
FIG. 3 is a partial exploded perspective view of the conductor rail of this invention.

Main body 12 includes a base portion 16, vertical stem portion 18 and head portion 20. Head portion 20 includes a top surface 22 and opposite side edges 24 and 26. Side edge 24 of head portion 20 includes an upper side portion 28 and a lower side portion 30. As seen, lower side portion 30 is spaced inwardly of side edge portion 28. A channel 32 extends inwardly into head portion 20 at side portion 24 at the juncture of side edge portions 28 and 30, as seen in FIG. 3. Similarly, side portion 26 of head portion 20 includes an upper side edge portion 34 and a lower side edge portion 36 which is spaced inwardly of side edge portion 34. Channel 38 is formed in head portion 20 at the juncture of side edge portions 34 and 36, as seen in the drawings.

The facing cap 14 includes a top portion 40 having opposite side portions 42 and 44 extending downwardly therefrom, the lower ends thereof terminating adjacent channels 32 and 38, respectively. Plate members 46 and 48 are received in the channels 32 and 38, respectively, as seen in the drawings. The horizontally disposed lower edge of side portion 42 is welded to the vertically disposed outer edge of plate member 46 by weldment 50. Similarly, the lower horizontal edge of side portion 44 is welded to the vertically disposed outer edge of plate member 48 by weldment 52.

The aluminum bar or body 12 is extruded in various shapes and sizes depending on the electrical requirements of a particular application. Common among all these shapes and sizes is a "head" wherein the stainless steel will be attached. The head of the bar may vary in width, but will be sized to accommodate three pieces of steel to be attached by welding.

The C-shaped cap 14 is produced by roll-forming. This method of manufacture enhances the properties of the steel by work-hardening. The steel is produced with tight tolerances to create an intimate bond between the aluminum and stainless steel.

The two steel tabs or plate members 46 and 48 are also produced by roll-forming. Roll-forming these shapes allows for flexibility in creating edges on the steel that are conducive to assembly and welding.

Aluminum, as soon as it is exposed to air, creates an oxide. This oxide protects the aluminum in various environments and is desirable. However, this oxide is high in resistance and must be removed where the cap will be attached to provide a low resistance interface between the aluminum and steel. This oxide is removed along the entire length of the aluminum bar with a wire brush. The wire brush is configured on a shaft so that it spins like a wheel, removing the oxide from the aluminum. Immediately after the oxide is removed, a thin layer of oxide inhibiting grease is applied. This grease will prevent oxide from forming on the head and will also serve to prevent corrosion between the two dissimilar metals.

The inside of the C-shaped steel is also cleaned with a wire brush to remove any foreign materials. Once cleaned it is ready to be attached to the aluminum.

The members 46 and 48 are pressed into the channels 32 and 38 of the aluminum head. The C-shaped cap 40 is pressed on to the top of the head. The product is then introduced to a series of rollers that press the C-shaped cap and tabs around the head of the conductor. As the conductor passes through the rollers under pressure, two automated MIG welders join the C-shaped cap and the tabs. Rollers on either side of the welders act to maintain the position of the steel and also maintain straightness of the conductor.

The conductor assembly is then cut to length. Both ends are deburred to eliminate any sharp edges. Holes are drilled through the web on both ends of the conductor to accommodate splice plates which will be used to join adjacent conductors in the field.

Thus it can be seen that the invention accomplishes at least all of its stated objectives.

I claim:

1. A conductor rail, comprising:
    a main body including a base portion, a vertical stem portion, and a head portion;
    said head portion having a top surface and opposite side surfaces;
    each of said opposite side surfaces of said head portion having a channel formed therein;
    and a facing cap secured to said head portion;
    said facing cap including a top portion having opposite side portions extending downwardly therefrom; said side portions having lower ends which terminate adjacent said channels;
    said facing cap also including plate members which are welded to the lower ends of said side portions and which extend into said channels;
    said main body being comprised of a first metal material;
    said facing cap being comprised of a second metal material.

2. The conductor rail of claim 1 wherein said main body is comprised of an aluminum material and said facing cap is comprised of a stainless steel material.

3. The conductor rail of claim 1 wherein each of said side portions has a generally horizontally disposed lower edge and wherein each of said plate members have generally vertically disposed outer edges which are spaced inwardly of respective lower edges of said plate members.

4. The conductor rail of claim 3 wherein said lower edges of said side portions are welded to said outer edges of said plate members.

5. The conductor rail of claim 2 wherein each of said side portions has a generally horizontally disposed lower edge and wherein each of said plate members have generally vertically disposed outer edges which are spaced inwardly of respective lower edges of said plate members.

6. The conductor rail of claim 5 wherein said lower edges of said side portions are welded to said outer edges of said plate members.

7. The conductor rail of claim 1 wherein said plate members are generally parallel to said top surface of said main body.

8. The conductor rail of claim 2 wherein said plate members are generally parallel to said top surface of said main body.

* * * * *